United States Patent [19]
Stephenson

[11] 4,399,466
[45] Aug. 16, 1983

[54] DARK CURRENT COMPENSATING LENS IRIS CONTROL

[75] Inventor: Donald L. Stephenson, Lancaster, Ohio

[73] Assignee: Calspan Corporation, Buffalo, N.Y.

[21] Appl. No.: 334,298

[22] Filed: Dec. 24, 1981

[51] Int. Cl.³ .................. H04N 5/16; H04N 5/193
[52] U.S. Cl. .................. 358/228; 358/221
[58] Field of Search ............. 358/221, 228, 161, 27, 358/34, 172

[56] References Cited

U.S. PATENT DOCUMENTS

| | | | |
|---|---|---|---|
| 3,180,934 | 4/1965 | Altman | 358/221 |
| 3,558,809 | 1/1971 | Aoki | 358/221 |
| 3,737,571 | 6/1973 | Gaebele et al. | 358/221 |
| 3,814,849 | 6/1974 | Bucher et al. | 358/221 |
| 4,194,220 | 3/1980 | Frame | 358/221 |
| 4,232,331 | 11/1980 | Motoyama et al. | 358/44 |
| 4,237,407 | 12/1980 | Yokokawa et al. | 358/221 |
| 4,291,338 | 9/1981 | Thomas | 358/228 |

Primary Examiner—Tommy P. Chin
Attorney, Agent, or Firm—Biebel, French & Nauman

[57] ABSTRACT

The iris of the lens of a closed circuit television camera is controlled to maintain an approximately constant magnitude video signal irrespective of dark current generated by the camera tube. The television camera includes an optically black filter covering the initial horizontal scans of the camera. A dark current sample is taken for each video field during a horizontal scan behind the optically black filter. A compensated video signal is generated by substituting the dark current sample for blanking portions of the video signal. The compensated video signal and the dark current sample are passed to a differential integrator the output of which is used to drive a motor which automatically controls the iris of the camera lens to maintain a selected magnitude video signal. Manual control of the iris can be selected by the camera operator; however, a protection circuit couples the automatic iris control to partially close the lens iris if lighting conditions could potentially damage the camera tube while the iris control is in the manual mode.

6 Claims, 4 Drawing Figures

DARK CURRENT COMPENSATING LENS IRIS CONTROL

BACKGROUND OF THE INVENTION

The present invention relates to closed circuit television cameras utilizing silicon diode arrays and, more particularly, to the automatic control of the lens iris of such television cameras to maintain an approximately constant magnitude video signal regardless of fluctuations in the dark current level of the array.

Silicon diode arrays are commonly used in closed circuit television cameras. In such arrays, a charge density pattern is formed by photoconduction in response to incident light on the array. The charge density pattern which is effectively stored on the surface of the silicon is raster scanned by an electron beam to produce an output signal. The resulting output signal comprises a video current component proportional to the intensity of light illuminating the array and also a leakage current component commonly referred to as the dark current of the array. The leakage current component is referred to as the dark current since it is produced even in the absence of light. For a silicon diode array such leakage or dark current approximately doubles for each 10° C. increase in the temperature of the array.

In typical closed circuit television applicatons, e.g., security monitoring, it is desirable to have the cameras automatically maintain video signal levels of a sufficient amplitude to allow effective monitoring. Such video signal levels can be insured by utilizing the video signal to control the iris of the closed circuit television cameras. Such iris control maintains the video signal amplitude over varying lighting conditions for the areas to be observed. For example, poorly lighted areas require a more open iris setting than brightly lighted areas. By monitoring the magnitude of the video signal generated by the closed circuit television camera, the iris can be effectively controlled.

For a required magnitude of video signal, a first iris setting is required in a dimly lit area. When additional light is provided to that area, such as by increases in natural sunlighting, the iris must close down to maintain the same video amplitude and prevent the monitored picture from becoming washed out, thus reducing the effectiveness of the monitored picture. Conversely, of course, the iris must open up when the lighting to brightly lit areas is reduced. Such iris control is effective in controlled environments, such as internal monitoring for a security system in an apartment or commercial building. However, when closed circuit television cameras are mounted in harsh environments, such as to monitor outdoor locations or various industrial processes where temperature variations can cause drastic changes in the dark current level of the signal generated by the camera, alternate measures must be taken.

In the past, iris control in such hostile environments has included adjusting the video level acceptable for iris control when elevated temperatures of the camera are expected; manual operator control of the iris of the camera; or building an artificial environment for the camera where suitable temperatures can be maintained. Such prior art measures tend to make operation of the system inconvenient, complex or, in the case of artificial environments, overly expensive.

SUMMARY OF THE INVENTION

The shortcomings of the prior art are overcome in accordance with the present invention by controlling the lens iris of a closed circuit television camera with a video signal which is processed to compensate for varying dark current levels generated by the camera tube. The television camera is fitted with an optically black filter covering portions of the camera tube corresponding to selected horizontal beam scans of the camera. The video signal from the television camera is sampled during a horizontal beam scan which occurs under the optically black filter for generating a signal representative of the dark current. Horizontal and vertical blanking portions of the video signal are replaced with the sampled dark current to generate a compensated video signal. The compensated video signal is then utilized to automatically control the iris of the television camera lens. The circuitry for controlling the iris of the television camera further comprises circuitry for selectively setting the magnitude of the video signal maintained by the automatic iris control circuit.

In accordance with one feature of the present invention, automatic iris control can be overridden by manual controls operated at the monitor of the associated television camera. When the iris control circuit is in the manual mode, camera protection is provided by coupling the automatic iris control circuit to partially close the lens iris for defined elevated video signal levels.

In the illustrative embodiment of the invention, the automatic iris control comprises a differential integrator responsive to both the dark current sample and the compensated video signal to control the lens iris so that the video signal generated by the camera is maintained at a selected level.

It is an object of the present invention to provide an improved lens iris control circuit which automatically compensates for variations in dark current; to provide an improved lens iris control circuit which will automatically control the lens iris irrespective of dark current levels generated by the associated camera tube and also allow manual control of the lens iris; and to provide an iris control circuit which automatically compensates for dark current generated by the associated camera tube, permits selective manual control of the lens iris and protects the camera tube from potentially damaging overexposure by intercoupling the automatic and manual controls.

These as well as other objects and advantages will become more apparent from the detailed description of the invention when read with reference to the drawings and the appended claims.

DETAILED DESCRIPTION OF THE INVENTION

Figure 1:
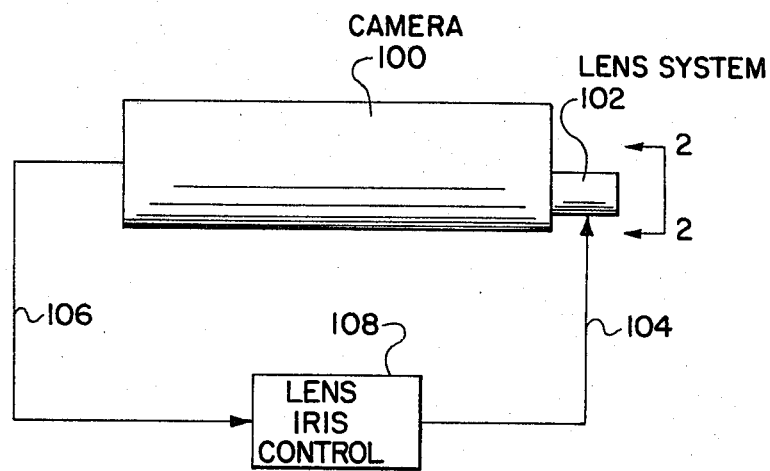
FIG. 1 is a block diagram of a closed circuit television camera system incorporating the present invention.

FIG. 1 shows a closed circuit television camera 100 having a lens system 102 including a motor driven iris which receives signals on the conductors 104 to control the iris opening. The camera 100 generates video signals on the conductor 106. The video signals on the conductor 106 are passed to the black current compensating iris control circuit 108 which generates iris control signals on the conductors 104 to control the iris opening of the lens 102.

Figure 2:
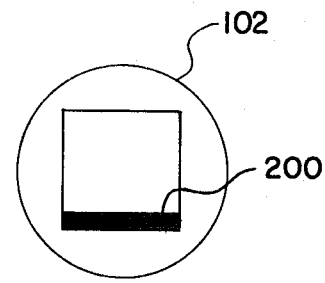
FIG. 2 illustrates the optical filter used in the present invention.

FIG. 2 illustrates an optically black filter 200 which prevents light from striking a selected portion of the camera tube face. Preferably, the filter is formed on the face of the camera tube or incorporated into the faceplate of the tube; however, any light blocking arrangement is satisfactory in accordance with the present invention. The optically black filter 200 permits a dark current sample to be taken by the iris control circuit 108.

The basic theory of operation of the present invention is to generate a dark current compensated video signal which can be used to control the iris opening of the lens 102 of a closed circuit television camera 100 to maintain the generation of an approximately constant amplitude video signal by the television camera. A portion of the light input to the television camera is blocked by the optically black filter 200 shown in FIG. 2 so that a dark current sample may be taken on horizontal scans of the camera 100 occurring behind the filter. For each field of video, a dark current sample is taken and maintained in a storage device during that field.

The video signal is amplified and the horizontal and vertical blanking portions of the amplified video signal are replaced with the dark current sample to generate a dark current compensated or clamped video signal, i.e., the video signal superimposed on the dark current generated by the camera tube. The dark current sample is then effectively subtracted from the dark current compensated video signal by means of a differential integrator. The difference between the two signals is integrated to generate a signal representative of the magnitude of the video information signal generated by the camera 100.

For automatic iris control, the integrated signal is passed to a first operational amplifier, the output of which is connected to a second operational amplifier. The motor which controls the iris of the lens 102 is connected between the outputs of the first and second amplifiers. The first and second amplifiers are also connected to a reference potential and interconnected so that a positive change on the input of the first amplifier causes a positive change in its output signal and a negative change in the output signal of the second amplifier. Conversely, a negative change on the input of the first amplifier causes a negative change in its output and a positive change in the output of the second amplifier.

As long as the integrated output signal is equal to the reference voltage connected to the two operational amplifiers, the iris setting remains constant. If the video information signal decreases in amplitude, the output signal of the first operational amplifier increases and the output signal of the second operational amplifier decreases. These signals are applied to the motor which controls the iris of the lens 102 and are poled to open the iris thus admitting more light and increasing the magnitude of the video information signal to restore the system to equilibrium and remove the iris "move" signals from the outputs of the first and second operational amplifiers. Conversely, if the video information signal increases in amplitude, the output signal of the first operational amplifier decreases and the output signal of the second operational amplifier increases to close the iris of the lens 102 until equilibrium is once again restored.

For manual control, a switch which passes the integrated video information signal to the first operational amplifier is opened and the inputs to the first operational amplifier are controlled by manual iris open and close signals generated by the operator of the closed circuit television monitoring system. A by-pass circuit is connected around the open switch from the integrated video information signal to the input of the first operational amplifier to protect the camera tube. In the event that the integrated video information signal becomes large relative to the reference voltage applied to the operational amplifiers, the lens iris is partially closed to prevent damage to the camera tube.

Figure 3A:
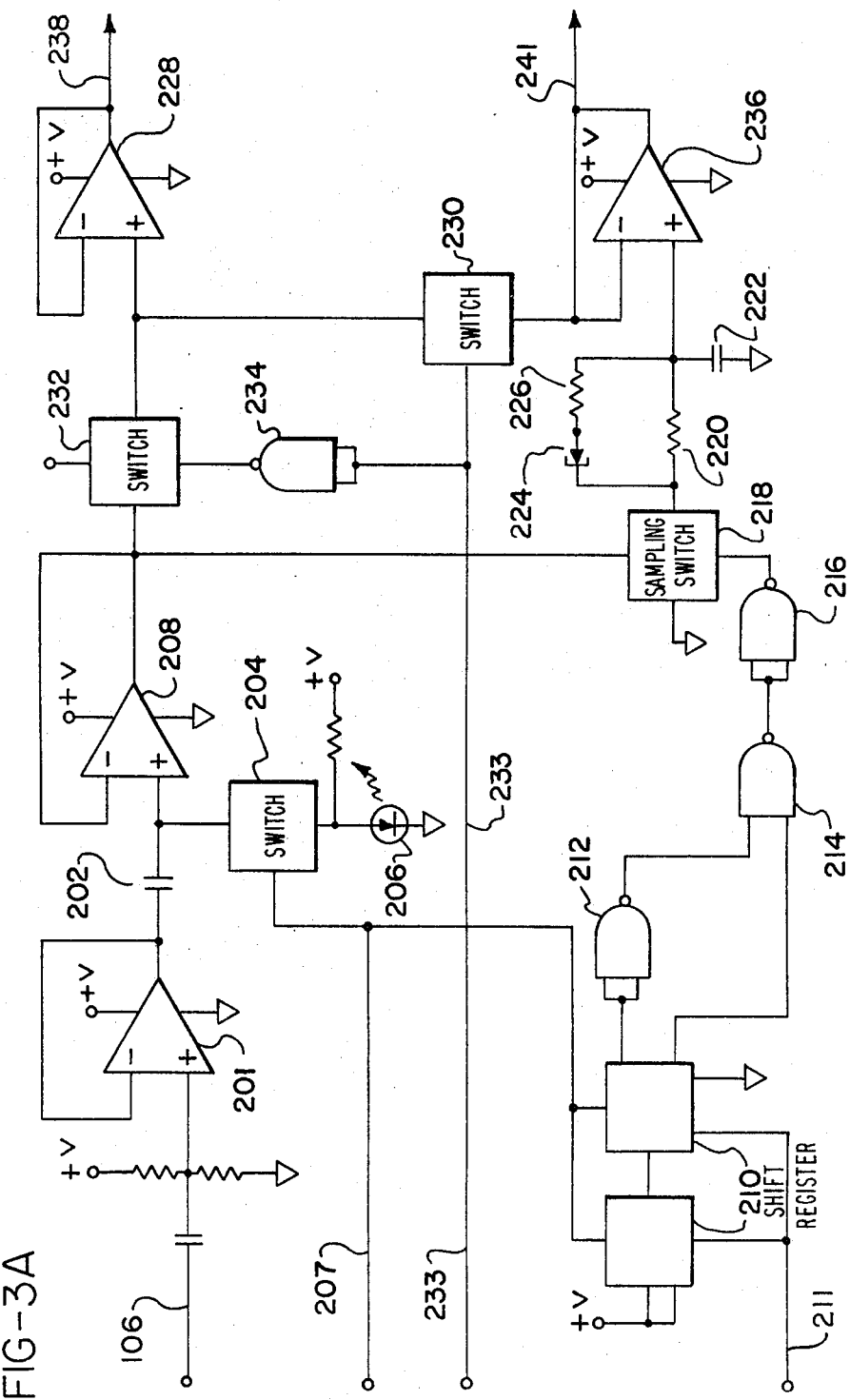
FIGS. 3A and 3B together form a schematic diagram of the iris control circuit in accordance with the present invention.
Figure 3B:
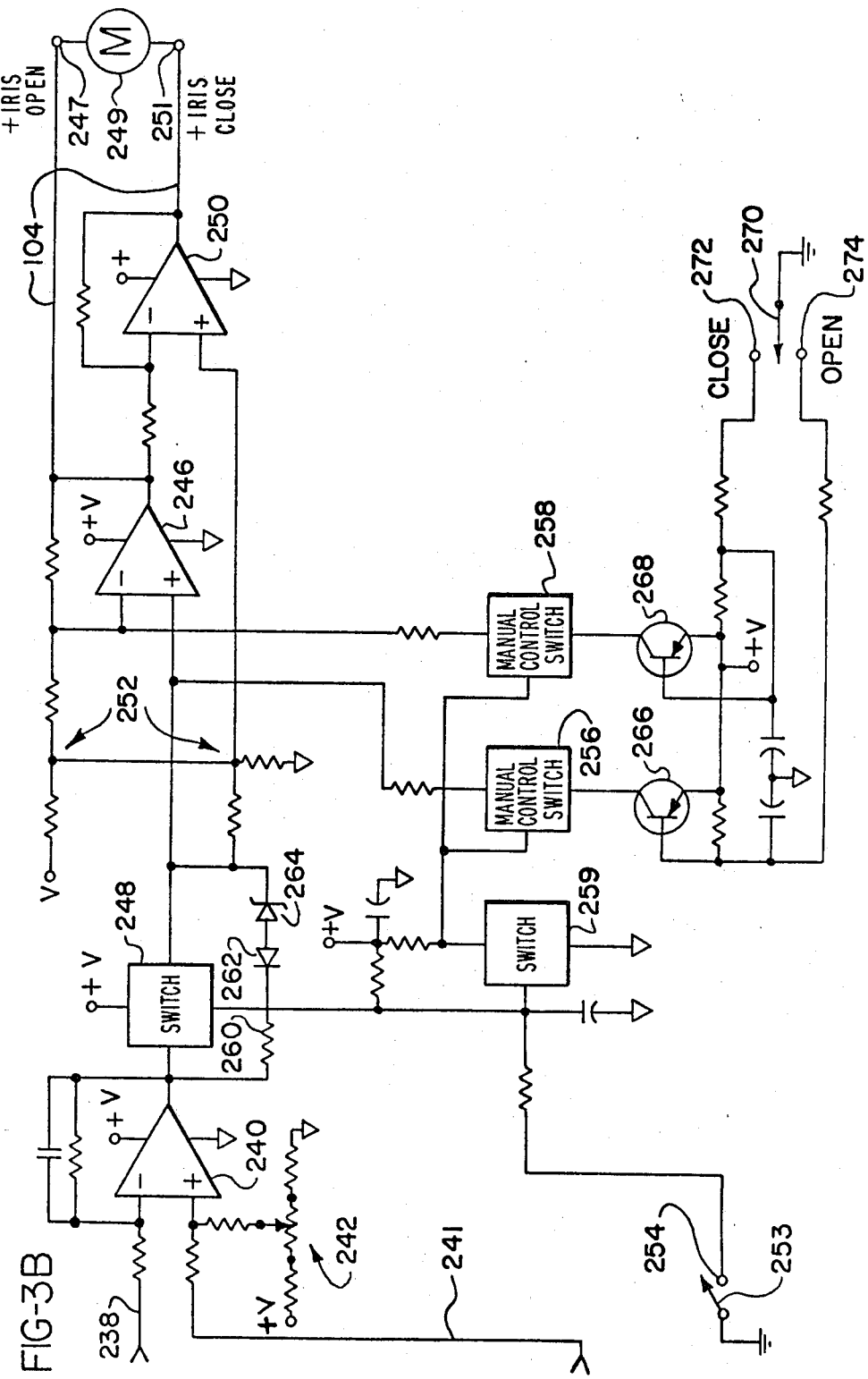

Reference is now made to FIGS. 3A and 3B which together form a detailed schematic diagram of the dark current compensating iris control circuit 108 of FIG. 1. The video signal from the camera 100 is received on the conductor 106 and amplified by operational amplifier 201 which is connected as a unity gain amplifier and serves as an impedance converting butter to isolate the video signal on the conductor 106 from the remainder of the iris control circuit. The capacitor 202 together with the switch 204 and light emitting diode (LED) 206 form a clamp circuit which re-establishes the direct current (DC) level of the video signal. The switch 204 is operated by the horizontal drive signal received on the conductor 207.

The light emitting diode 206 establishes a positive voltage of approximately 1.5 volts on the input to an operational amplifier 208 to insure that the operational amplifier 208 does not operate with ground potential on its input. The operational amplifier 208 serves as a buffer to isolate the clamp circuit from the remainder of the iris control circuit. The output of the operational amplifier 208 is the video input signal on the conductor 106 with a base DC level of approximately 1.5 volts.

To remove the effects of the dark current from the signal on the output of the operational amplifier 208, a dark current sample is taken during each video field. The sample is taken during the time that the silicon diode array is being scanned at a location behind the filter 200 of FIG. 2. The filter 200 covers approximately the first 12 horizontal scan lines of the camera tube. A sample of the dark current is obtained during the seventh horizontal scan of the silicon diode array. The sample is taken by an eight-bit shift register 210 which is clocked by the horizontal drive signal received on conductor 207 and reset by the vertical drive signal received on conductor 211.

The input signal to the shift register 210 is held high so that a high signal or logical "one" is sequentially shifted into the individual stages of the shift register 210. The output signal of the eighth stage of the shift register is inverted by a NAND gate 212 and combined with the output signal of the seventh stage of the shift register by a NAND gate 214. The output of the NAND gate 214 is inverted by a NAND gate 216 to drive the sampling switch 218. Thus, the shift register 210 is cleared by each vertical drive signal and the horizontal drive signals clock the shift register to shift a logical one sequentially into the eight stages. Once the shift register 210 is filled by the action of the first eight horizontal drive pulses, it remains full until cleared by the next vertical drive pulse.

The arrival of the high signal at the seventh stage of the shift register 210 activates or closes the switch 218 via the NAND gates 214, 216 and the arrival of the high signal at the output of the eighth stage of the shift register deactivates the switch 218 via the NAND gates 212, 214 and 216. The resistor 220 together with the capacitor 222 form a sample and hold circuit with a large charging time constant so that intermittent overloads of the target surface will not appreciably change the charge on the capacitor 222. A Schottky diode 224 and resistor 226 form a fast discharge network for the capacitor 222 for overloads which persist for a sufficient period of time to change the charge on the capacitor 222.

A dark current compensated video signal is generated at the output of operational amplifier 228 by replacing the horizontal and vertical blanking portions of the video signal received from the operational amplifier 208 with the sampled dark current stored on the capacitor 222. Switches 230 and 232 are driven by a combined blanking signal, i.e., the combination of the horizontal and vertical blanking signals, on the conductor 233 and the inverse of the combined blanking signal from the NAND gate 234, respectively. Thus, during periods of active video information, the operational amplifier 228 receives the video signal from the operational amplifier 208 through the switch 232. During periods of horizontal and vertical blanking, the signal from the operational amplifier 208 is interrupted by opening the switch 232 and the sampled dark current stored on the capacitor 222 is passed by a unity gain buffer amplifier 236 through the switch 230 to the input of the operational amplifier 228. Accordingly, the signal on the output of the operational amplifier 228 comprises the video signal information imposed on a DC voltage level which is equal to the dark current generated by the silicon diode array of the television camera tube.

The dark current compensated video signal on the output of the operational amplifier 228 is differentially integrated to control the iris of the lens 102 of the camera 100. The signal from the operational amplifier 228 is passed via conductor 238 to the negative input of an operational amplifier 240, while the dark current signal on the output of the operational amplifier 236 is passed via conductor 241 to the positive input of the operational amplifier 240. The operational amplifier 240 is connected as a differential integrator so that the signal on its output is effectively equal to the integrated value of the difference between the compensated video signal on the output of the operational amplifier 228 and the dark current signal on the output of the operational amplifier 236. Accordingly, the operational amplifier 240 generates a video level signal. The resistor network 242, connected to the positive input of the operational amplifier 240, can be adjusted to set the video level maintained by the iris control circuit 108.

For automatic control of the iris setting of the lens 102, the output signal of the operational amplifier 240 is connected to the positive input of operational amplifier 246 through a switch 248. Since the compensated video signal from the operational amplifier 228 is received on the negative input of the operational amplifier 240, increases in the magnitude of the video signal produce decreases in the integrated output signal of the operational amplifier 240; and decreases in the magnitude of the video signal produce corresponding increases in the integrated output signal of the operational amplifier 240.

The output of the operational amplifier 246 is connected to the "open" terminal 247 of the motor 249 which controls the iris of the lens 102 and also to the negative input of an operational amplifier 250. The output of the operational amplifier 250 is connected to the "close" terminal 251 of the motor 249 which controls the iris of the lens 102. The negative input of the operational amplifier 246 and the positive input of the operational amplifier 250 are connected to a reference voltage generated by a resistance network 252. The motor 249 opens the iris of the lens 102 if the open terminal 247 is positive relative to the close terminal 251 and closes the iris if the close terminal 251 is positive relative to the open terminal 247.

As long as the value of the integrated signal from the operational amplifier 240 is equal to the reference voltage applied to the operational amplifiers 246, 250, the motor 249 controlling the iris is not activated and the iris setting does not change. If the video signal level increases resulting in a decrease in the integrated output of the operational amplifier 240, the output signal of the operational amplifier 246 is decreased which causes an increase in the output signal of the operational amplifier 250 to apply a voltage which operates the motor 249 to close the iris. The iris closes until the video signal amplitude is reduced to a point where the integrated output of the operational amplifier 240 is once again equal to the reference voltage applied to the operational amplifiers 246, 250 so that the iris setting is once again stable.

Conversely, if the magnitude of the video signal decreases which results in an increase in the integrated output signal of the operational amplifier 240, the operational amplifier 246 has an increase in output signal level, while the operational amplifier 250 has a decrease in output signal level. This voltage polarity operates the motor 249 to open the iris of the lens 102. The iris is opened until the video signal level increases to a point where the output of the operational amplifier 240 is once again equal to the reference voltage applied to the operational amplifiers 246, 250. In this manner, the iris setting of the lens 102 is automatically adjusted to maintain a magnitude of video signals determined by the setting of the resistance network 242.

The iris can also be controlled manually by operating switch 253 to apply a ground signal on auto/manual input terminal 254. In the manual mode the switch 248 is opened and manual control switches 256, 258 are closed via switch 259. The opening of switch 248 removes the output signal of the operational amplifier 240 from the positive input of the operational amplifier 246. However, the switch 248 is shunted by a protection circuit comprising a series combination of a resistor 260, a diode 262 and a zener diode 264. This shunt path provides protection of the television camera tube while the iris control circuit is in the manual mode as will be described hereafter.

When the iris control circuit is in the manual mode, the switches 256 and 258 connect PNP transistors 266, 268 to the positive and negative inputs of the operational amplifier 246, respectively. A switch 270 is provided to connect ground to either the "close" terminal 272 or the "open" terminal 274 to manually control the operation of the iris motor 249 to respectively close or open the iris of the lens 102. The switch 270 is biased to return to a neutral position, as shown in FIG. 3, when not activated by the operator of the monitoring system utilizing the iris control circuit.

The protection circuit comprising the resistor 260, the diode 262 and the zener diode 264 protects the camera tube from damage in the event that an operator leaves the iris control circuit in the manual mode with the iris so fully opened that the incoming light may damage the tube. In that event, the protection circuit partially closes the iris if lighting conditions are such that the camera tube could be damaged. The integrated signal from the operational amplifier 240 is coupled to the positive input of the operational amplifier 246 through the protection circuit. If the integrated output of the operational amplifier 240 exceeds the reference voltage by the sum of the zener voltage of the zener diode 264 and the forward voltage of the diode 262, the iris will be partially closed by the protection circuit coupling to the automatic portion of the iris control circuit. If the iris control circuit is then switched to the automatic mode by opening switch 253, the protection circuit is by-passed by the operation of the switch 248 and the iris is closed to the full extent provided by the automatic operation as previously described.

While a large variety of circuit components are available and may be utilized in the illustrative embodiment of the present invention, typical commercially available devices are listed below for the major circuit elements.

| | |
|---|---|
| Operational amplifiers 201, 208, 228, 236 and 240 | CA3160, available from Radio Corporation of America |
| Operational amplifiers 246 and 250 | $\mu$A759, available from Fairchild Corporation |
| Switches 204, 218, 230, 232, 248, 256, 258 and 259 | MC14066B, available from Motorola Corporation |
| Shift Register 210 | MC14015B, available from Motorola Corporation |

While the form of apparatus herein described constitutes a preferred embodiment of the invention, it is to be understood that the invention is not limited to this precise form of apparatus and that changes may be made therein without departing from the true spirit and scope of the invention which is defined in the appended claims.

What is claimed is:

1. A circuit for controlling the iris of a lens of a television camera in which said camera includes an optically black filter covering selected horizontal beam scans of said camera, said circuit compensating for variations in dark current to control said iris in response to video signals including blanking portions from said camera independently of said variations in dark current and comprising:
   sampling means for generating a dark current signal by sampling and storing the video signals from said camera during said selected horizontal beam scans;
   compensating means coupled to said camera for generating a dark current compensated video signal by substituting said dark current signal for said blanking portions of said video signals; and
   automatic iris control means responsive to said dark current compensated video signal for controlling said lens iris to maintain a defined magnitude video signal.

2. The circuit of claim 1 further comprising video level setting means connected to said automatic iris control means for selecting said defined video signal magnitude.

3. The circuit of claim 2 further comprising manual iris control means connected to said automatic iris control means for controlling said lens iris in response to manually generated control signals, and selection means connected to both said automatic iris control means and said manual iris control means for selectively switching between automatic and manual control of said lens iris.

4. The circuit of claim 3 further comprising protection means connected to said selection means for automatically closing said lens iris in response to defined video signal levels when said selection means is set for manual control of said iris.

5. The circuit of claim 1, 2, 3 or 4 wherein said automatic iris control means comprises:
   differential integration means connected to said sampling means and said compensating means for integrating a signal comprising the difference between said compensated video signal and said dark current signal to generate a video level signal; and
   motor control circuit means connected to said differential integrator means for generating iris control signals in response to said video level signal.

6. The circuit of claim 5 wherein said motor control circuit means comprises first and second operational amplifiers having outputs coupled to said iris for passing said iris control signals thereto.

* * * * *